April 28, 1970 | R. D. BROWNING | 3,508,719

MAGNETIC TAPE REEL

Filed Jan. 2, 1968 | 2 Sheets-Sheet 1

INVENTOR
Robert D. Browning

BY Eugene M. Whitacre

ATTORNEY

April 28, 1970 R. D. BROWNING 3,508,719

MAGNETIC TAPE REEL

Filed Jan. 2, 1968 2 Sheets-Sheet 2

INVENTOR
Robert D. Browning
BY Eugene M. Whitacre
ATTORNEY

United States Patent Office 3,508,719

Patented Apr. 28, 1970

3,508,719
MAGNETIC TAPE REEL

Robert D. Browning, Indianapolis, Ind., assignor to RCA Corporation, a corporation of Delaware Filed Jan. 2, 1968, Ser. No. 695,256
Int. Cl. B65h 75/18
U.S. Cl. 242—71.8 2 Claims

ABSTRACT OF THE DISCLOSURE

In a magnetic tape reel, means are provided on the outwardly facing surfaces of the reel flanges for the interlocking of two or more reels stacked one upon the other.

This invention relates to a magnetic recording tape reel and more particularly to an improvement in the reel structure to facilitate the easy handling, stacking and storing of two or more of such reels.

Heretofore, the structure of magnetic recording reels was such that when two or more reels were stacked one upon the other, there was a high probability of the reel face flanges becoming scuffed or scratched due to rubbing contact therebetween. In addition, more often than not, two or more reels would not stably stack one upon the other, since one would tend to slip on the other.

It is an object of the present invention to provide an improved tape reel structure.

It is another object of the present invention to provide an improved tape reel construction which lends itself to a stable stacking arrangement of two or more reels with a minimum of surface scuffing and scratching of the reel face flanges.

In a preferred embodiment of the invention a tape reel is provided with circular-like beads or ridges integrally formed on the outwardly facing surfaces of the opposing face flanges. The inside diameter of the bead on one of the flanges is substantially equal to the outside diameter of the opposite bead on the other flange, thereby to enable one bead portion to nest within the complementary bead portion of another reel similarly constructed.

The novel features which are considered to be characteristic of the invention are set forth with particularity in the appended claims. The invenion itself, however, both as to its organization and method of operation as well as additional objects and advantages thereof, will best be understood from the following description when read in connection with the accompanying drawings in which:

Figures 1, 2:
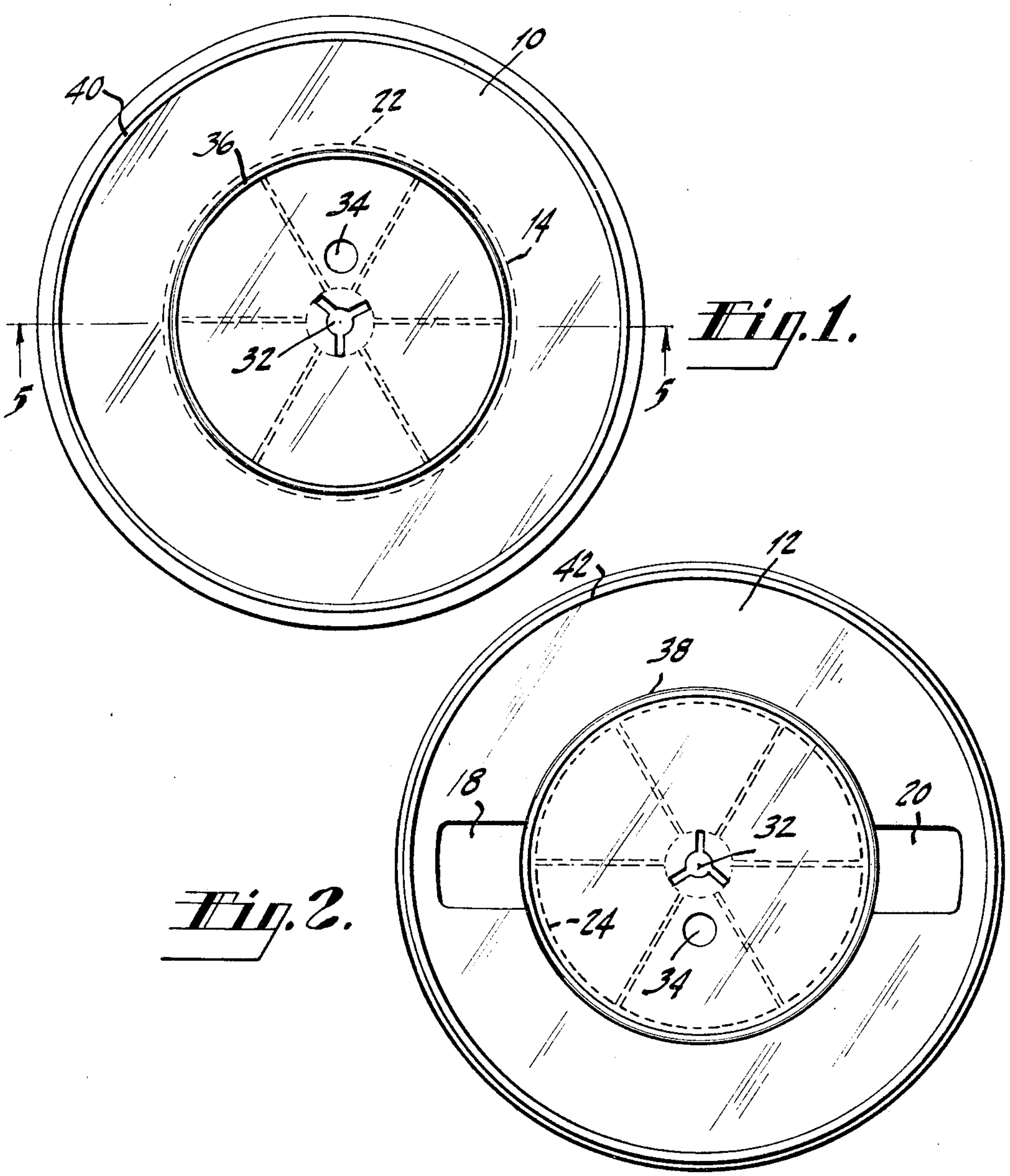
FIGURE 1 is a top view of a magnetic tape reel embodying the present invention.
FIGURE 2 is a bottom view of the magnetic tape reel of FIGURE 1.
Figure 3:
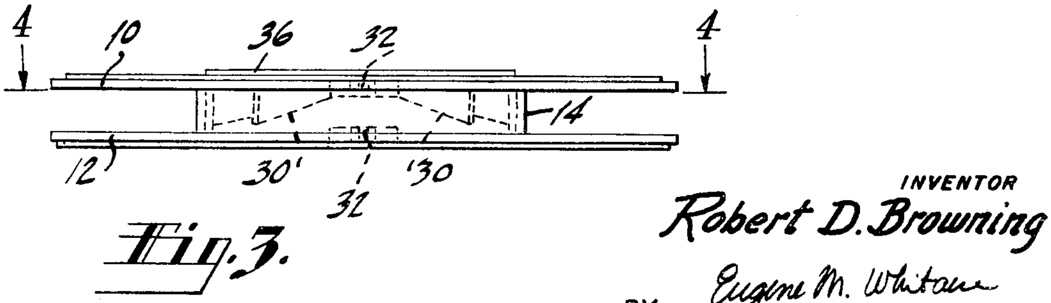
FIGURE 3 is a side elevational view of the magnetic tape reel of FIGURE 1.

Referring now to the drawings, an improved magnetic tape reel constructed in accordance with the present invention includes a pair of parallel circular face flanges 10 and 12 spaced apart by a central cylindrical hub member 14 around which a magnetic tape (not shown) would normally be wound. The width of the hub member 14 is just slightly greater than the width of the tape to be wound therearound. Bottom flange 12 includes a pair of apertures 18 and 20. The apertures provide an access means to allow an operator to fixedly hold the first few turns of a magnetic tape against the reel hub during a tape threading operation.

Figure 4:
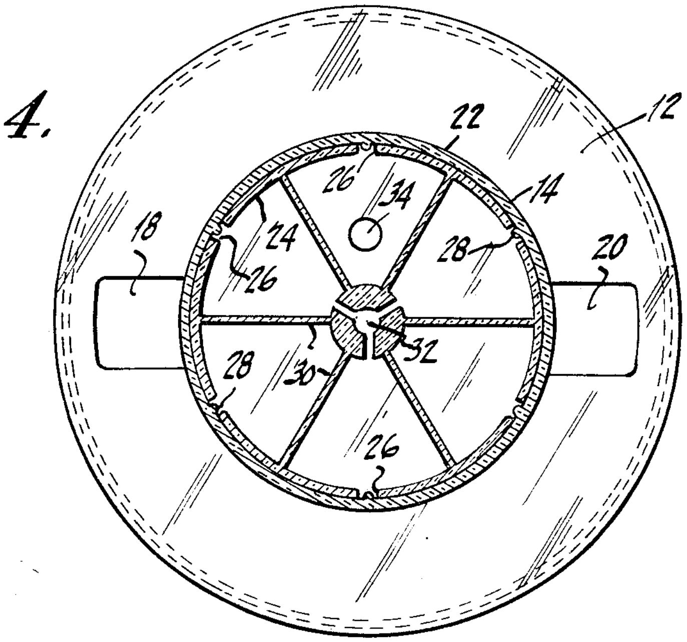
FIGURE 4 is a cross sectional view of the magnetic tape reel taken along the line 4—4 of FIGURE 3.
Figure 5:
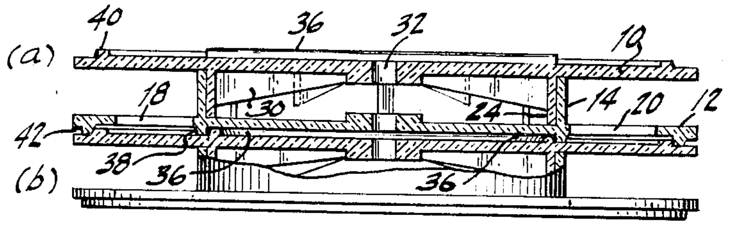
FIGURE 5 is a cross sectional view of the magnetic tape reel taken along the line 5—5 of FIGURE 1 with the reel shown in cooperative nesting engagement with another reel of similar construction and embodying the features of the present invention.

As can be seen by the cross-sectional views of the reel in FIGURES 4 and 5, the hub member 14 may be comprised of two concentric cylindrical portions 22 and 24, with the hub outer portion 22 being attached to or integrally formed (as by molding) with the bottom flange 12, and the hub inner portion 24 being attached to or integrally formed with the top flange 10. The hub portion 22 is of a relatively larger diameter than the hub portion 24 so that during assembly, the two hub portions can be telescoped into closely adjacent relation with each other to form the hub member 14 bounded by the parallel flanges 10 and 12. To facilitate the interconnecting assembly of the concentric hub portions 22 and 24 in a locked arrangement, the inner portion 24 is provided with a plurality of equally spaced slots 26 designed to mate with and receive complementary tab projections 28 formed on the inside surface of the outer hub portion 22.

As shown particularly in FIGURES 1 and 4 the construction of the hub member 14 may be strengthened by the inclusion of a plurality of radially extending spoke members 30 integrally formed with the inner portion 24 and the top flange 10. A keyed spindle receiving hole 32 is provided in the center of the reel to receive a drive spindle (not shown). An additional spindle hole 34 is provided near the center of the reel as shown in FIGURES 1 and 2 to allow the reel to be adapted for use in receiving apparatus having a second drive spindle.

The improvement in reel construction to which the present invention is directed will now be described.

Integrally formed with and depending from the outwardly facing surfaces of the flanges 10 and 12 and concentric with the hub member 14 are circular ridge or bead members 36 and 38 respectively. The beads may conform to a full ring or annulus as shown by members 36 and 38 (FIGURES 1 and 2) or may comprise sector portions of an annulus concentric with the hub member 14. The inside diameter of one of the bead members, as for example member 38, is substantially equal to the outside diameter of the other bead member, for example member 36. In this way, one bead member complements the other. Thus, two or more tape reels constructed in accordance with the present invention may be stacking one upon the other with complementary bead members on opposed flanges of the reels mating with or nesting within one another. This construction and stacking arrangement is seen more particularly in FIGURE 5 where the depending ridge 38 of reel (*a*) is nested adjacent the depending ridge 36 of reel (*b*). As can be seen in the figure, a second pair of complementary circular-like bead members 40 and 42 may be formed in accordance with the present invention near the peripheral edges of the flanges 12 and 10 respectively and concentric with the hub member 14. The inside diameter of the bead member 42 is substantially equal to the outside diameter of the bead member 40. This additional pair of bead members provides for a more secure registration between complementary flange portions of two or more reels and further minimizes the possibility of reel slippage during stacking.

It is a preferred feature of the invention that at least one pair of complementary bead members, as for example members 36 and 38 be formed in the central area of the reel flanges. In this area, reel strength and rigidity is at a maximum and the flange warpage at a minimum. Thus, proper registration between mating bead members of reels constructed in this manner will be assured.

What is claimed is:

1. A reel for storing magnetic tape comprising:

a pair of parallel circular flanges spaced apart by a cylindrical central hub portion, the width of said hub portion between said flanges being slightly greater than that of the tape to be stored thereon;

a first ring-like bead formed on the outwardly facing surface of one of said flanges and concentric with said hub portion;

a second ring-like bead formed on the outwardly facing surface of the other of said flanges and concentric with said hub portion;

said first and said second beads formed on said circular flanges adjacent the area bounded by said hub portion;

the inside diameter of said first bead being substantially equal to the outside diameter of said second bead;

thereby to enable the first bead portion of said reel to nest within the second bead portion of another reel similarly constructed;

a third ring-like bead formed on the outwardly facing surface of said one flange and concentric with said hub portion, said third bead being adjacent the peripheral edge of said one flange; and a fourth ring-like bead formed on the outwardly facing surface of said other flange and concentric with said hub portion, said fourth bead being adjacent the peripheral edge of said other flange, with the outside diameter of one of said third and said fourth bead being substantially equal to the inside diameter of the other bead.

2. A reel for storing magnetic tape as defined in claim 1 wherein the outside diameter of said fourth bead is substantially equal to the inside diameter of said third bead.

References Cited

UNITED STATES PATENTS

| | | | |
|---|---|---|---|
| 1,391,372 | 9/1921 | Connell. | |
| 2,834,507 | 5/1958 | Metzler | 242—55.42 X |

NATHAN LOUIS MINTZ, Primary Examiner